United States Patent
Chang et al.

(10) Patent No.: US 9,859,988 B2
(45) Date of Patent: Jan. 2, 2018

(54) COMMUNICATIONS APPARATUS

(75) Inventors: Joseph Sylvester Chang, College Station, TX (US); Chai Lung Lee, Singapore (SG); Tong Ge, Singapore (SG)

(73) Assignee: Advanced Electroacoustics Private Limited, Singapore (SG)

( * ) Notice: Subject to any disclaimer, the term of this patent is extended or adjusted under 35 U.S.C. 154(b) by 547 days.

(21) Appl. No.: 14/006,234

(22) PCT Filed: Mar. 20, 2012

(86) PCT No.: PCT/US2012/029726
§ 371 (c)(1),
(2), (4) Date: Oct. 3, 2013

(87) PCT Pub. No.: WO2012/129193
PCT Pub. Date: Sep. 27, 2012

(65) Prior Publication Data
US 2014/0018016 A1    Jan. 16, 2014

Related U.S. Application Data

(60) Provisional application No. 61/466,279, filed on Mar. 22, 2011.

(51) Int. Cl.
*H04B 5/00* (2006.01)
*H04B 15/00* (2006.01)
(Continued)

(52) U.S. Cl.
CPC .......... *H04B 15/00* (2013.01); *H04M 1/7253* (2013.01); *H04M 1/72575* (2013.01);
(Continued)

(58) Field of Classification Search
None
See application file for complete search history.

(56) References Cited

U.S. PATENT DOCUMENTS

| 5,239,687 A | 8/1993 | Chen |
| 7,420,615 B2 * | 9/2008 | Tsai .................. H04M 1/0208 348/14.1 |

(Continued)

FOREIGN PATENT DOCUMENTS

| CN | 101690256 A | 3/2010 |
| EP | 1 715 719 A2 | 10/2006 |

(Continued)

OTHER PUBLICATIONS

International Preliminary Report on Patentabililty (IPRP) mailed Oct. 3, 2013, by The International Bureau of WIPO, Geneva, Switzerland, in related International Application No. PCT/US2012/029726 (6 pages).

(Continued)

*Primary Examiner* — Tuan A Tran
(74) *Attorney, Agent, or Firm* — Osha Liang LLP

(57) ABSTRACT

A versatile communications (comms) apparatus to provide a means to measure the audio (earphone) output of an electronic device (e.g. a music player in a smartphone), and/or to provide a means for wireless communications between a first electronic device (e.g. a smartphone) and a second electronic device (e.g. a hearing aid, pacemaker, etc). In some embodiments, the comms apparatus does not need power and in other embodiments, its power may be harvested from the first electronic device, or drawn from a battery that may be recharged by harvesting means or charged directly. The first electronic device typically includes an audio (earphone) output, a microphone input (with a voltage bias), a long-range communications transceiver (e.g. GSM), and where pertinent, a short-range transceiver (e.g. Bluetooth) and is internet enabled. In one embodiment, the comms apparatus provides a means where the audio output (earphone) of the electronic device is sampled by its microphone input, or by electronics in the (Continued)

comms apparatus. In other embodiments, the comms apparatus is an intermediary communications device between the first electronic device and the second electronic device. The communications therein may be simplex and/or duplex, via either the audio output (earphone), microphone input, short-range transceiver, and/or a combination thereof. The communications data (via the comms apparatus) may be transmitted elsewhere, including via the internet by means of the internet enabled electronic device.

10 Claims, 8 Drawing Sheets

(51) Int. Cl.
| | |
|---|---|
| *H04M 1/725* | (2006.01) |
| *H04R 29/00* | (2006.01) |
| H04M 1/04 | (2006.01) |
| H02J 7/32 | (2006.01) |
| H04R 27/00 | (2006.01) |

(52) U.S. Cl.
CPC ............. *H04R 29/001* (2013.01); *H02J 7/32* (2013.01); *H04M 1/04* (2013.01); *H04M 1/72591* (2013.01); *H04R 27/00* (2013.01); *H04R 2227/003* (2013.01); *H04R 2420/07* (2013.01); *Y02B 40/90* (2013.01)

(56) References Cited

U.S. PATENT DOCUMENTS

| | | | |
|---|---|---|---|
| 7,810,729 B2 | 10/2010 | Morley, Jr. | |
| 7,869,608 B2 | 1/2011 | Sander et al. | |
| 7,912,503 B2* | 3/2011 | Chang | H04M 1/72527 455/552.1 |
| 8,185,155 B2* | 5/2012 | Chang | H04M 1/72527 455/552.1 |
| 8,362,745 B2* | 1/2013 | Tinaphong | H02J 17/00 320/101 |
| 8,587,488 B2* | 11/2013 | Knudsen | H01Q 1/243 343/728 |
| 8,783,531 B2* | 7/2014 | Kroupa | B65H 75/4431 224/162 |
| 9,143,590 B2* | 9/2015 | Goldman | H04M 1/6066 |
| 2003/0003864 A1 | 1/2003 | Locke | |
| 2005/0075146 A1 | 4/2005 | Kridner | |
| 2007/0087780 A1* | 4/2007 | Nassimi | H04M 1/6066 455/556.1 |
| 2009/0179768 A1 | 7/2009 | Sander et al. | |
| 2009/0208024 A1 | 8/2009 | Farver et al. | |
| 2009/0295591 A1 | 12/2009 | Bedingfield | |
| 2009/0296967 A1 | 12/2009 | Mullenborn et al. | |
| 2010/0108762 A1 | 5/2010 | Morley, Jr. | |
| 2010/0278350 A1 | 11/2010 | Rung | |
| 2011/0007916 A1 | 1/2011 | Chapero-Rueda et al. | |
| 2011/0033064 A1 | 2/2011 | Johnson et al. | |
| 2011/0070927 A1* | 3/2011 | Gilmore | H02J 17/00 455/573 |
| 2011/0136541 A1* | 6/2011 | Chang | H04M 1/72527 455/558 |
| 2011/0155404 A1 | 6/2011 | Dai | |
| 2012/0183097 A1 | 7/2012 | Ishizaki | |

FOREIGN PATENT DOCUMENTS

| | | |
|---|---|---|
| EP | 2144044 A1 | 1/2010 |
| JP | 11-098235 A | 4/1999 |
| JP | 2002-057755 A | 2/2002 |
| JP | 200294619 A | 3/2002 |
| JP | 2003515964 A | 5/2003 |
| JP | 2004-040589 A | 2/2004 |
| JP | 2005-117664 A | 4/2005 |
| JP | 2006-033700 | 2/2006 |
| JP | 2006-217708 A | 8/2006 |
| JP | 2007510318 A | 4/2007 |
| JP | 3928015 B2 | 6/2007 |
| JP | 2009-218693 A | 9/2009 |
| JP | 2010-103853 A | 5/2010 |
| RU | 4677 U1 | 8/1997 |
| RU | 2240599 C2 | 11/2004 |
| RU | 2257676 C2 | 7/2005 |
| RU | 2398291 C2 | 8/2010 |
| RU | 101602 U1 | 1/2011 |
| WO | 0022874 A2 | 4/2000 |
| WO | 2005034577 A1 | 4/2005 |
| WO | 2007/131511 A2 | 11/2007 |
| WO | 2008/144654 A1 | 11/2008 |
| WO | 2009/006897 A1 | 1/2009 |
| WO | 2009/009689 A1 | 1/2009 |
| WO | 2009/155255 A1 | 12/2009 |
| WO | 2011/030804 A1 | 3/2011 |

OTHER PUBLICATIONS

Notice of Reasons for Rejection ("Office Action") dated Nov. 17, 2015, issued by the Japan Patent Office in related Japanese Patent Application No. JP-2014-501174, with Google English machine-translation (11 pages).
Official Action dated Mar. 26, 2015, by the State Intellectual Property Office of the People's Republic of China in corresponding Chinese Patent Application No. 201280025067.X (6 pages).
EPO Communication with Extended European Search Report dated Aug. 28, 2015, issued by the European Patent Office, The Hague, Germany, in corresponding European Patent Application No. EP-12760843.8 (10 pages).
International Search Report for corresponding International Application No. PCT/US2012/029726, dated Jun. 28, 2012 (2 pages).
Written Opinion for corresponding International Application No. PCT/US2012/029726, dated Jun. 28, 2012 (4 pages).
Notice of Reasons for Rejection (Official Action) dated Dec. 2, 2014, issued by the Japan Patent Office in corresponding Japan Patent Application No. JP 2014-501174 (5 pages), with Google machine translation (5 pages).
Office Action issued in corresponding European application No. 12760843.8, dated Apr. 12, 2017 (4 pages).
Office Action dated Mar. 21, 2017 in corresponding Japanese Patent Application No. 2016-054356 (6 pages).
Office Action issued in corresponding Japanese Application No. 2016-145477, dated Sep. 5, 2017 (7 pages).

* cited by examiner

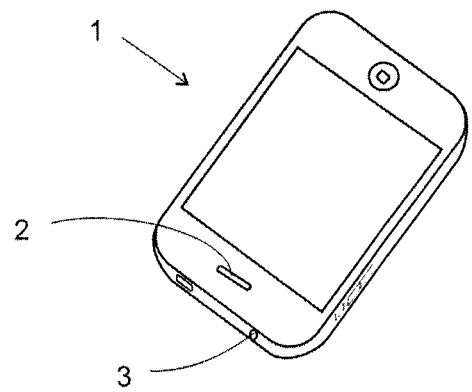
Figure 1(a) (Prior-Art)
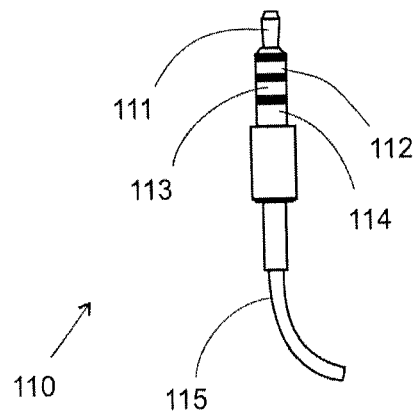
Figure 1(b) (Prior-Art)

COMMUNICATIONS APPARATUS

CROSS REFERENCE TO RELATED APPLICATIONS

This is a national stage application of PCT/US2012/029726, filed on Mar. 20, 2012, which claims the priority of U.S. Provisional Application No. 61/466,279, filed on Mar. 22, 2011. This application claims the benefit and priority of these prior applications and incorporates their disclosures be reference in their entirety.

FIELD OF THE INVENTION

This invention relates to a communications apparatus to provide a means to measure the audio output of an electronic device (e.g. a portable music player in a smartphone); and/or to provide a means for wireless communications between a first electronic device (e.g. a smartphone) and a second electronic device (e.g. a hearing aid, pacemaker, and the like), and communications may be communicated elsewhere via the internet.

BACKGROUND OF THE INVENTION

Many electronic devices, including portable music players, have a microphone input that is typically biased to around 2.3V. The microphone input is typically connected to an external microphone or it may be used as a power source (from its bias); for simplicity, 'microphone input' and 'microphone bias' will be used interchangeably. In these electronic devices, the microphone and the earphone operate independently. In the case of music players, when music is played (the output is at the earphone output), the microphone, input is often unused and/or when used, it may be used a control input where modulated signals are input for digital control for play/pause and for volume up/down. In telephony applications, an external microphone (as part of a earphone-cum-microphone audio accessory) may be connected to the microphone input.

Examples of electronic devices embodying a music player include a plethora of smartphones and portable MP3 (and variants thereof) players. In such electronic devices, there is no reported easy method in terms of hardware or convenience to estimate (or compute) the loudness and duration of the music/sound exposed to the user of the music player who wears earphones connected to the earphone output of the music player. This loudness and duration constitutes to the noise dosage of the user arising from the acoustical (sound) output from the loudspeaker in the earphone. Safety limits for noise dosage is well established, for example the 1910.95 standards established by USA's Occupational Safety and Health Administration and similar bodies in other countries. When the noise dosage exceeds the stipulated safety limits, the user of the electronic device may suffer from noise induced deafness.

There is no easy method in terms of convenience and hardware because of one or more of the following reasons. First, any added hardware or equivalently a communications (comms) apparatus, for example the inventions delineated in U.S. patent application Ser. No. 12/971,673, requires an external power source (such as an external battery) that would require periodic replacement or charging (external of the electronic device (music player)). Second, the operating system of music players (e.g. in smartphones) does not allow other applications therein access to the output of its digital signal processor/digital-to-analog converter/power amplifier. This lack of access renders the need for hardware external to the music player where the external hardware would need access the earphone output to monitor/measure its electronic signal output (and use the output/input transfer function from the acoustic output of the loudspeaker to its electronic input) or to directly measure the acoustical output of the loudspeaker. Cumbersome/impractical prior-art inventions include US Patent 2009/0208024, US Patent No. US 2010/0278350, etc.

In short, there is no known method to exploit the microphone bias to make it convenient or to reduce the hardware to realize a means of ascertaining the output of the earphone and/or thenoise dosage. The ability to ascertain the noise dosage would increase the functionality of the electronic device (e.g. smartphone as a music player).

The functionality of sophisticated electronic devices, e.g. the smartphone, can be increased by connecting electronics (embodied in a communications (comms) apparatus) whose input is connected to one of the earphone outputs (of the smartphone). In a prior-art invention, the smartphone functions as a remote controller (e.g. for a television), as manufactured by Thinkflood. The remote controller is embodied in a housing with a TRRS connector that is in turn inserted into the TRRS socket of the smart phone. The smartphone outputs a signal via one or both of its earphone outputs (right, left or both audio channel outputs) according to an application in the smartphone. The output signal is thereafter converted by electronics (embodied in the comms apparatus) to an infrared signal that is transmitted. In this prior-art application, the comms apparatus is an intermediary device for a simplex transmission (communication between the smartphone and the television) only by infrared signals. There are two shortcomings of this invention—the limitation of infrared only and the mechanical construction. The limitation of only infrared is probably due to the desired application, and the use of the earphone output thereby disallowing the use of a earphone/headphone. The mechanical connection is simply the insertion of the TRRS connector into the TRRS socket of the smartphone—no mechanical attachment between the housing and the enclosure. As this device protrudes out of the smartphone, it can be broken easily. In short, the functionality is restricted and mechanically weak (easily broken).

Another prior-art simplex transmission is the magnetic induction transmission between a mobile phone (smartphone) and a hearing aid. The transmitter is the magnetic field generated by the loudspeaker in the mobile phone. The hearing aid has a telecoil (T-coil) which generates a voltage from the magnetic field induced from the magnetic field generated by the loudspeaker. The serious shortcoming of this prior-art method is that the magnetic field generated by the loudspeaker is very weak, requiring careful and difficult placement/alignment (require fiddling—trial and error to try to find a 'sweet' spot) of the loudspeaker (of the mobile phone) near the hearing aid. In most cases, the magnetic induction remains weak, rendering the simplex transmission unsatisfactory, and the speech intelligibility poor.

In the invention described in U.S. Pat. No. 7,810,729 B2, the microphone input of the electronic device (smartphone) serves as an input and a possible power source. This invention is an intermediary device, a comms apparatus, between the credit card and the smartphone—a credit card reader. The credit card information is read and processed by the electronic device and its output modulated onto the same microphone line—akin to the Play/Pause and Volume Up/Down of prior-art earphone headsets described in U.S. Pat. No. 7,869,608 B2. This invention has a major mechanical shortcoming as in the case of the infrared controller delineated earlier. Specifically, the credit card reader is embodied in a housing with a TRRS connector that is in turn inserted into the TRRS socket of the smartphone, and there is no mechanical attachment between the housing of the credit card reader and the enclosure of the smartphone. The credit card reader protrudes out of the smartphone and is hence mechanically weak (easily broken).

In the invention described in patent application US 2009/0296967, the telephone apparatus (an internal comms apparatus) is part of the telephone set which requires such telephones to be specialized, and the pertinent telephones are typically corded and wireless (DECT) phones. This invention is hence limiting as it is not easily adapted to any phone, particularly smartphones.

In the invention described in USA Patent Application US 2011/0007916, the add-on module (comms apparatus) is largely applicable only to specialized telephone handsets which are not ubiquitous. This is hence not generally applicable nor convenient. Further, the mechanical connection is weak (easily broken).

In the invention described in US Patent 2004/2406892, the intermediary comms apparatus is a cumbersome attachment that includes a microphone to pick up the acoustical loudspeaker output of the phone. The cumbersomeness is largely due to the difficult attachment, large form factor and the electronics therein requiring an external battery.

In the aforesaid inventions and prior-art electronic devices with their associated comms apparatus, the application of the smartphone (and the like) remains limited and often cumbersome, and this is due to a number of reasons. First, in the case of ascertaining noise dosage arising from the audio output of an electronic device, there is no easy means in terms of convenience or in terms of hardware and power source, rendering their realization in large form factor, hence commercially unacceptable. Second, the power available from the microphone bias in the electronic device is very limited, typically <250 microamperes at <2V.

Third, in applications where the microphone input is already connected to a microphone, this input means is largely unavailable as a power source or as an input. Fourth, when data is input into the microphone, the microphone input is not easily applicable as a power source. Fifth, in applications where the earphone output of the electronic device (e.g. smartphone) is already connected to a loudspeaker of earphones (or headphones), this means as an output to the electronics in the comms apparatus is not readily available. For example, the infra-red remote control delineated above cannot be used.

In short, prior-art comms apparatus inventions for measuring the earphone output of electronic devices (e.g. music players in smartphones) and for communications between a first electronic device (e.g. smartphone) and a second electronic device (e.g. hearing aid, pacemaker, etc) are cumbersome and limiting, or mechanically weak (easily broken). Physically, they are often external devices (a separate entity), requiring an external power source, communications are limited (e.g. localized communications instead of more global communications (for example communications between a third electronic device (e.g. a hearing diagnostic system) at one end of the internet, a smartphone (first electronic device) at the other end of the internet, and communications between the smartphone and a hearing aid (second electronic device) via the comms apparatus)), and applicable only to specialized phones, etc.

OBJECT OF THE INVENTION

It is therefore the object of this invention to overcome the shortcomings stated above, and to provide an intermediary communications (comms) apparatus that provides an easy means to measure the output of an electronic device (e.g. a music player in a smartphone)—easy in terms of convenience, hardware simplicity and mechanically strong (not easily broken). It is also an object to provide an intermediary comms apparatus to provide a means for wireless communications between the first electronic device (such as a smartphone) and the second electronic device (e.g. hearing aid, pacemaker, etc.), where said means are easy in terms of convenience, hardware simplicity and mechanically strong. In both objects, the power requirements of the comms apparatus are either zero or are modest, in part enabling a small form factor realization. If the first electronic device is internet enabled, the data indicative of the aforesaid wireless communications may be communicated via the internet, thereby communications between the third electronic system (e.g. hearing aid diagnostic instrument) at one end of the internet and the first electronic device (e.g. smartphone) at the other end of the internet, and then communications between the same first electronic device (e.g. smartphone) and the second electronic device (e.g. hearing aid, pacemaker, etc) via the comms apparatus.

SUMMARY OF THE INVENTION

The present invention provides for a versatile Communications (Comms) Apparatus.

In the first embodiment of the invention, the Comms Apparatus provides a simple means for the microphone of an electronic device (e.g. music player in a smartphone) to sample its earphone output. One low-hardware means is simply a resistor. In the preferred first embodiment, resistor in the first embodiment may be disconnected to allow an external microphone to be connected to the microphone input. In the further preferred first embodiment, electronics in the Comms Apparatus samples the earphone output, and power to the electronics is derived from the microphone input. In the yet further preferred first embodiment, the Comms Apparatus further embodies a battery whose power for its charging is derived from the microphone input. The power to the electronics is derived either from the microphone input or from the battery, or a combination thereof. An external microphone may also be connected to the microphone input. The electronics in the Comms Apparatus has a means to input signals to the microphone input.

In the second embodiment of the invention, the electronics in the Comms Apparatus includes a passive transmitter (for transmission to the second electronic device (e.g. hearing aid)) connected to the earphone output of the first electronic device (e.g. smartphone), and may include a loudspeaker. In the preferred second embodiment of the invention, the transmitter is active where power is derived by harvesting means, including from the microphone input, audio output, radio frequency output, or a combination thereof, of the first electronic device. In the further preferred second embodiment, the Comms Apparatus further includes a battery whose power for its recharging is derived from one or more aforesaid harvested means. In the yet further preferred second embodiment, the electronics in the Comms apparatus has a means to input signals to the microphone input. An external microphone may also be connected to the microphone input.

In the third embodiment of the invention, the audio earphone output is unused. The Comms Apparatus has two transceivers, one to communicate with the first electronic device (e.g. smartphone) and the other to communicate to the second electronic device (e.g. hearing aid). The Comms Apparatus further includes a battery whose power for its recharging is derived by harvesting means. An external microphone may also be connected to the microphone input.

In all embodiments, the first electronic device may be internet enabled, and data (and that indicative of the data between the Comms Apparatus and the first electronic device and/or a third electronic device, or otherwise) may be transmitted/received elsewhere by means of the internet.

BRIEF DESCRIPTION OF THE DRAWINGS

FIG. 1(a) (Prior Art) is a diagram of a prior-art electronic device, more specifically a mobile phone (smartphone) that may be internet enabled.

FIG. 1(b) (Prior-Art) is a diagram of the ubiquitous 4-conductor 3.5 mm plug, also commonly known as the TRRS (Tip-Ring-Ring-Sleeve) plug; the common 3-conductor version is also known as TRS (Tip-Ring-Sleeve).

FIG. 3(d) is a diagram illustrating the yet further preferred first embodiment of the invention where the electronics in the comms apparatus samples an audio output of the earphone. The power to said electronics may be derived either from the microphone input or from a rechargeable battery. The power to charge the battery is derived from the microphone input. The comms apparatus embodies switches that select where the microphone input is connected to, and where the power source for the electronics is derived from.

DETAILED DESCRIPTION OF THE INVENTION

Figure 2A:
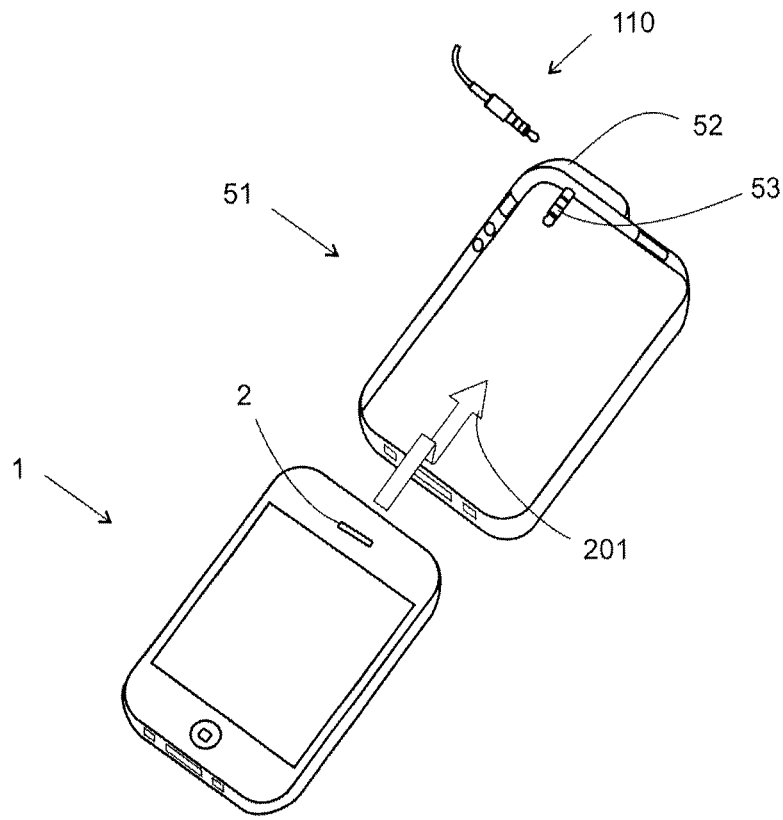
FIG. 2(a) is a diagram illustrating an embodiment of the present invention as a communications (comms) apparatus whose housing serves as the casing (bumper) of an electronic device (smartphone). The electronic device (smartphone) may be slipped into the casing.

The present invention is a communications (comms) apparatus—an intermediary communications device—to provide an easy means to measure the output of an electronic device (e.g. a music player in a smartphone) and/or to provide a means for wireless communications between a first electronic device (such as a smartphone) and a second electronic device (e.g. hearing aid, pacemaker, etc.). The uniqueness of the invention includes versatility, small form factor, either no power/very low power requirements, low cost and strong mechanical connection integrity (between the comms apparatus and first electronic device), leading to unprecedented convenience.

FIG. 1(a) depicts a prior-art Mobile Phone 1, an electronic device (smartphone), drawn upside down where Loudspeaker Output 2 and (Audio Output-cum-Microphone Input) Socket 3 are indicated.

FIG. 1(b) depicts the prior-art ubiquitous (3.5 mm) Plug 110 used in many music players and mobile phones as the stereo Audio Output-cum-Microphone Input Plug and this may be inserted into Socket 3. In the 4-pin plug (TRRS, Tip-Ring-Ring-Sleeve) version, the conductors are (tip) Left Channel 111, (ring) Right Channel 112, (ring) Ground 113 and (sleeve) Microphone 114. A bias voltage (and hence a power source, see later) is available for biasing a (external) microphone at Microphone 114 and where applicable, modulated signals on this conductor can provide signaling (controls) to Mobile Phone 1. For example in some electronic devices such as music players in smartphones, these modulated signals can control play/pause and volume up/down. In the 3-pin plug (TRS, Tip-Ring-Sleeve) version, Microphone 114 is absent.

In FIG. 2(*a*), (first electronic device) Mobile Phone 1 is now drawn the right way up where Loudspeaker Output 2 is now on the top. Mobile Phone 1 can be slipped into Comms Apparatus 51 from the bottom as indicated by Arrow Direction 201. In this diagram, Comms Apparatus 51 is drawn as a bumper (or casing) for Mobile Phone 1, an example of the physical housing of the present comms apparatus, and the electronics therein is embodied in Casing 52. Comms Apparatus 51 may be constructed in a number of ways, including as a casing, semi-casing, extended plug, etc, adapted to be physically attached to the enclosure of Mobile Phone 1. When Mobile Phone 1 is slipped into Comms Apparatus 51, Plug 53 of Comms Apparatus 51 is inserted into Socket 3 (see FIG. 1(*a*)) of Mobile Phone 1. Plug 53 is similar to Plug 110 in FIG. 1(*b*) or its variants.

In FIG. 2(*b*), Mobile Phone 1 is now slipped into Comms Apparatus 51. The electronics in Casing 52 can now communicate with second electronic device, Hearing Aid 54. This communication can either by simplex as indicated by Indicator 202 or duplex as indicated by Indicator 203.

FIGS. 3 (*a*)-(*d*) respectively depicts the first embodiment, preferred first embodiment, further preferred first embodiment and yet further preferred first embodiment of the present invention—Comms Apparatus 51 that provides a means to measure the output of the earphone audio output of an electronic device, for example a portable music player, a music player in a smartphone, etc. An example of an application is a noise dosimeter to ascertain the noise exposure of the user of the electronic device. Other applications are possible. FIG. 3(*a*) illustrates the first embodiment of the invention where Comms Apparatus 51 embodies Resistor 60. In this diagram, Processor 20 in Mobile Phone 1 has an input (Microphone Input 21) and two outputs connected to Left Amplifier 25 and Right Amplifier 26 whose audio outputs are respectively Left Channel Output 22 and Right Channel Output 23. Loudspeaker 81 and Loudspeaker 82 are loudspeakers of a earphone or headphone set, typically connected to a 3.5 mm TRS or TRRS plug, Plug 110 depicted in FIG. 1(*b*). In a typical application, Left Loudspeaker 81 of a earphone/headphone set is connected between Left Channel Output 22 and Ground 24, while Right Loudspeaker 82 of the same earphone/headphone set is connected between Right Channel Output 23 and Ground 24.

The electronics in Comms Apparatus 51 is extremely simple—Resistor 60 is connected across Left Channel Output 22 and Microphone Input 21 of Mobile Phone 1. Resistor 60 provides a means for Microphone Input 21 to sample an attenuated output of Left Channel Output 22. The attenuation is due to a voltage division between Resistor 60 and input resistance at the node of Microphone Input 21. The ratio of the voltage division can be adjusted by changing the value of Resistor 60 or connecting another resistor between Left Channel Output 22 and Ground 24. It is possible to use means other than a resistor to sample output of Left Channel 22, and a voltage division may be obtained by other methods.

In the first embodiment of the invention in FIG. 3(*a*), it would not be possible to connect an external microphone to Microphone Input 21 of Mobile Phone 1; the external microphone is typically the microphone in an earphone-cum-microphone audio accessory. This is because the sampled signal from Left Channel Output 22 would corrupt or overwhelm the output of the external microphone. To circumvent this limitation, the preferred first embodiment of the present invention depicted in FIG. 3(*b*) offers a simple solution by means of Switch 61 where when External Microphone 83 is required, Switch 61 connects Microphone Input 21 to External Microphone 83, and Resistor 60 is disconnected. Conversely, when External Microphone 83 is not required, Switch 61 connects Resistor 60 to Microphone Input 21 and Left Channel Output 22, and External Microphone 83 is disconnected. The toggling of Switch 61 may be manual or it can be electronic.

In both first embodiment and preferred first embodiment of the invention depicted respectively in FIGS. 3(*a*) and (*b*), with the sampling of the audio output, the acoustical output of the Loudspeaker 81 may be ascertained/estimated and the noise dosage calculated from the transfer function relating the acoustical output/electronic input of Loudspeaker 81.

It is apparent that there are several unique advantages of the first embodiment and first preferred embodiment of the present invention, including no external power required for Comms Apparatus 51, the extreme simplicity of electronics in the Comms Apparatus 51 and its ensuing very small form factor. These uniqueness would provide a highly practical and commercially acceptable noise dosimeter.

FIG. 3(*c*) depicts the further preferred first embodiment of the invention where power is now harvested from Microphone Input 21. Comms Apparatus 51 comprises Power Management 63 and Electronics 64. As before, the input to Loudspeaker 81 and Loudspeaker 82 are respectively Left Channel Output 22 and Right Channel Output 23 of Mobile Phone 1. Electronics 64 derives its power from Microphone Input 21 via Power Management 63. Depending on the power requirements of the electronics in Electronics 64, Power Management 63 may be as simple as not requiring any electronics, a capacitor or as complex as a DC-DC converter followed by an LDO (low dropout linear regulator). Electronics 64 typically comprises a microcontroller with an Analog-to-Digital Converter (ADC). By means of the ADC, the output of Left Channel Output is sampled and the digital output of the ADC is thereafter processed by the microcontroller. The sampling of the audio output and ensuing signal processing may have several applications. For example, in the dosimeter application, the microcontroller in Electronics 64 can ascertain/estimate the noise dosage arising from the acoustical output of Loudspeaker 81 from the sampled inputs of Left Channel Output 22.

Electronics 64 may also be realized by a hybrid analog-digital means and this may provide lower hardware than the ADC/microcontroller hardware. For example, the analog version may comprise a full-wave rectifier and a lowpass filter. The output of the lowpass filter provides an overall power estimation of the earphone output and this would simplify the computation of noise dosage. There are a number of different ways of designing the hardware of Electronics 64.

For completeness, the primary difference between this further preferred first embodiment (FIG. 3(*c*)) and the earlier preferred and first embodiments (FIGS. 3(*a*) and 3(*b*)) is that Electronics 64 in the preferred first embodiment being active (requiring power) can now do much of the computation for a given specific application, conversely, in the first and preferred embodiments, this computation is computed by Mobile Phone 1. Note that power for Electronics 64 can be harvested from Microphone Input 21, and it can display its output by means of an LED, etc.

This further preferred first embodiment does not allow an external microphone to be connected to Microphone Input 21—as in the case of the first embodiment depicted in FIG. 3(*a*). To circumvent this limitation, thereby increase the versatility of the invented Comms Apparatus 51, the yet further preferred first embodiment depicted in FIG. 3(*d*) embodies switches in Power Management 63 that connect Microphone Input 21 to either External Microphone 83 or to the output of Electronics 64 via Connection 66. This embodiment further includes Battery 65 in Comms Apparatus 51. Note that as Battery 65 is now present, the sophistication of Electronics 64 can be considerable, including a microcontroller and other electronics.

The modus operandi is as follows (without External Microphone 83 and without Connection 65). Consider first the scenario where Electronics 64 is idle (inactive). In this case, the power to recharge Battery 65 is harvested from Microphone Input 21.

Consider now the second scenario where Electronics 64 is active. If sufficient current/power can be harvested from Microphone Bias 21, the power to operate Electronics 64 is harvested from Microphone Bias 21 and Battery 65 does not provide any power; sufficiency of power can be ascertained (by Power Management 63) by the level of the bias voltage of Microphone Bias 21 or by other means. If there is further residual/sufficient power harvested from Microphone Input 21, the power to recharge Battery 65 can also be harvested from Microphone Bias 21, and if not, Battery 65 would not be recharged. In the situation where the power harvested from Microphone Bias 21 is insufficient to operate Electronics 64, Battery 65 will be the secondary power source. In the above scenarios, switches in Power Management 63 will do the necessary connections to effect the aforesaid. Such connection designs are known to one skilled in the art.

Consider now when External Microphone 83 (typically the microphone in an earphone-cum-microphone audio accessory) is used/active (e.g. when Mobile Phone 1 is operating as a wireless transceiver (e.g. GSM, CDMA, etc)). In this case, switches in Power Management 63 connect only External Microphone 83 to Microphone Input 21. The power to operate Electronics 64 is now derived from Battery 65 via a switch in Power Management 63. In this fashion, power to operate Electronics 64 is always available, and External Microphone 83 connected to Microphone Input 21. When External Microphone is inactive, Microphone Input 21 may be harvested to recharge Battery 65.

For completeness, for one skilled in the art, it is easy to design such that power from Microphone Input 21 is harvested and yet Microphone Input 21 is simultaneously modulated. This is because the input of mobile phone 1 at Microphone Input 21 is ac coupled.

In this yet further preferred first embodiment of the present invention, Comms Apparatus 51 may be made even more versatile by allowing Electronics 64 to input data into Mobile Phone 1. This is shown in FIG. 3(*d*) where Microphone Input 21 may be connected to the Output of Electronics 64 (via Connection 66) which may modulate Microphone Input 21. This versatility now enables the communications between Mobile Phone 1 and Comms Apparatus 51 to be duplex. Unlike the earlier case where the output of Electronics 64 is not connected to Microphone Input 21, the computation/processing required for the intended application can now be computed in part or in whole by (an application in) Mobile Phone 1. In this connection configuration, both External Microphone 83 and Power Management 63 are disconnected from Microphone Input 21, and Electronics 64 is powered from Battery 65 via Power Management 63. The various switching may be realized by manual means or by means of electronic switches.

Consider now the second embodiment, preferred second embodiment, further preferred second embodiment and yet further preferred second embodiment of the present Comms Apparatus 51 invention. Unlike the previous first (and variant preferred) embodiments, the intention now is for communications between a first electronic device (e.g. a smartphone) and a second electronic device (e.g. a hearing aid, pacemaker, and the like)—put simply, Comms Apparatus 51 is an intermediary communications device between the first electronic device and the second electronic device.

FIG. 4(*a*) depicts the second embodiment of the invention where an application is short-range simplex communications between first electronic device Mobile Phone 1 and second electronic device via Comms Apparatus 51. In FIG. 2(*b*), the second electronic device is Hearing Aid 54, and in other applications, the second electronic device may be a pacemaker, etc. In one example application, first electronic device Mobile Phone 1 may be able to transmit data to second electronic device, including for simplex communication, for control, audio data communication, etc, via Comms Apparatus 51.

In FIG. 4(*a*), Comms Apparatus 51 comprises Transmitter 71 whose input is Left Channel Output 22 of first electronic device Mobile Phone 1. Transmitter 71 is a passive transmitter, thereby not requiring power, for example a telecoil (also known as T-coil) where the modality of transmission is magnetic induction; also known as loop system. In this application, second electronic device (e.g. Hearing Aid 54 in FIG. 2(*b*)) would embody a receiver realized by another telecoil. The transmission is achieved by the magnetic field (generated by the current from Left Channel Output 22 of Mobile Phone 1 in the transmitting telecoil (in Transmitter 71) induced into the receiving telecoil in the second electronic device. A voltage resembling the output voltage at Left Channel Output 22 is obtained at the output of the receiving telecoil—hence the simplex transmission from first electronic device Mobile Phone 1 to second electronic device (e.g. Hearing Aid 54) via Comms Apparatus 51.

In an application involving first electronic device Mobile Phone 1 and second electronic device Hearing Aid 54, the primary advantage of this second embodiment is the substantially increased strength of the magnetic induction of the telecoil in Transmitter 71 over the weak magnetic induction from Loudspeaker 2 of Mobile Phone 1 (FIG. 1(*a*)). On the basis of testing on the constructed prototype, the strength of magnetic induction arising from a telecoil as Transmitter 71 is approximately 20 dB stronger than from the Loudspeaker 2 of Mobile Phone 1. Practically, this advantage translates to real and much desired convenience—easy placement of Mobile Phone 1 to Hearing Aid 54 and with good transmission instead of having to carefully trying to align Loudspeaker 2 of Mobile Phone 1 to Hearing Aid 54 and yet with weak transmission. Psychoacoustically higher speech intelligibility is achieved.

In FIG. 4(*a*), when Transmitter 71 is connected to Left Channel Output 22 of Mobile Phone 1 via the insertion of Plug 53 (FIG. 2(*a*)) of Comms Apparatus 51 into Socket 3 (FIG. 1(*a*)) of Mobile Phone 1, Loudspeaker 2 of Mobile Phone 1 is disabled. This disabling of Loudspeaker 2 may be inconvenient because the usual acoustical output of Mobile Phone 1 is now unavailable. To circumvent this limitation, thereby restoring the acoustical output of Mobile Phone 1, the second embodiment of the invention as depicted in FIG. 4(a) may further include Loudspeaker 72 embedded in Comms Apparatus 51. The input of Loudspeaker 72 is connected to Right Channel Output 23 of Mobile Phone 1.

In some applications, Loudspeaker 72 may not be necessary. For example, in a hearing aid application where the user's hearing aid assembly includes a ear mold that completely blocks the ear canal (i.e. without a vent), typical of the severely and profoundly hearing impaired. In this case, the audio output from Loudspeaker 2 of Mobile Phone 1 or from Loudspeaker 72 would be inadequate in terms of acoustical output intensity. As Loudspeaker 72 in Comms Apparatus 51 is not useful, it may be replaced by another passive transmitter (e.g. another telecoil) connected Right Output Channel 23. Now, with two passive transmitters (instead of just one depicted in FIG. 4(a)), the strength of the magnetic induction transmission is doubled, thereby further improving the quality of the wireless transmission.

Figure 4A:
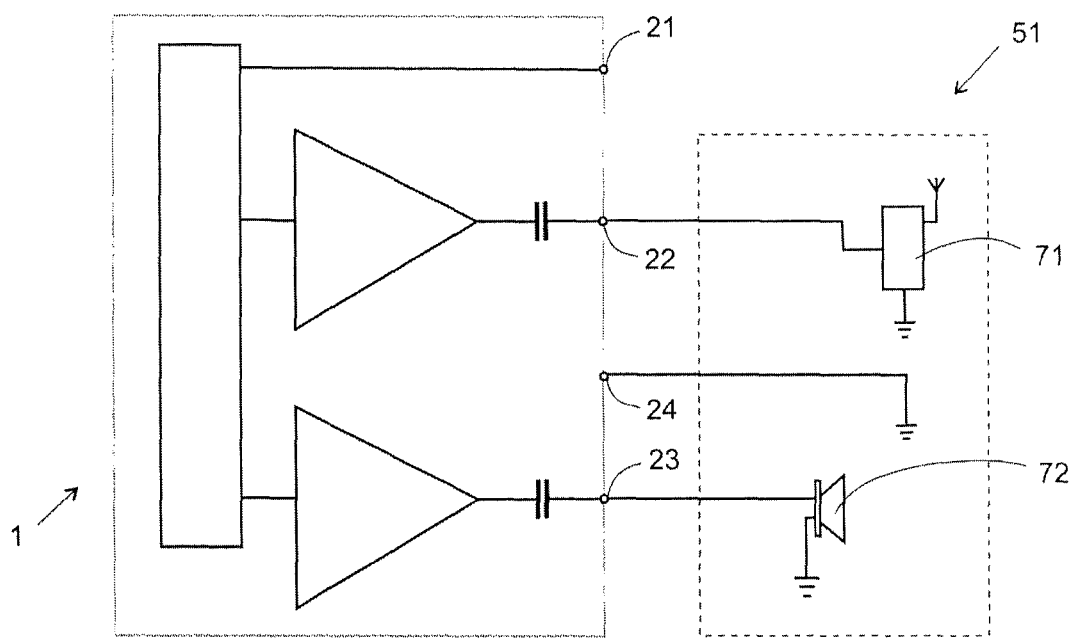
FIG. 4(a) is a diagram illustrating the second embodiment of the present invention as a comms apparatus where the electronics (including a transmitter) in the comms apparatus is passive (requiring no external power) and whose input is a earphone audio channel of the first electronic device (smartphone). The other earphone audio channel may drive a loudspeaker. The transmitter in the Comms Apparatus communicates with a second electronic device (hearing aid) depicted in FIG. 2(b). The loudspeaker may be connected to the other earphone output and provides acoustical output.
Figure 4B:
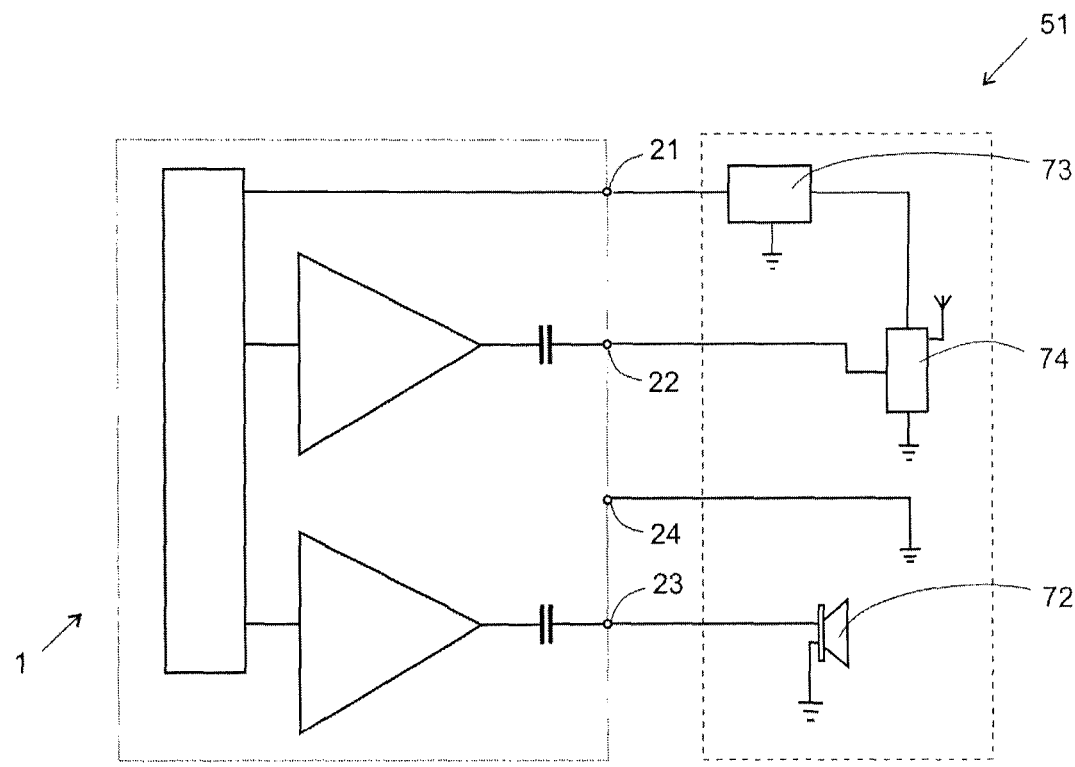
FIG. 4(b) is a diagram illustrating the preferred second embodiment where the power for the electronics in the comms apparatus is harvested from the microphone input of the first electronic device.
Figure 4C:
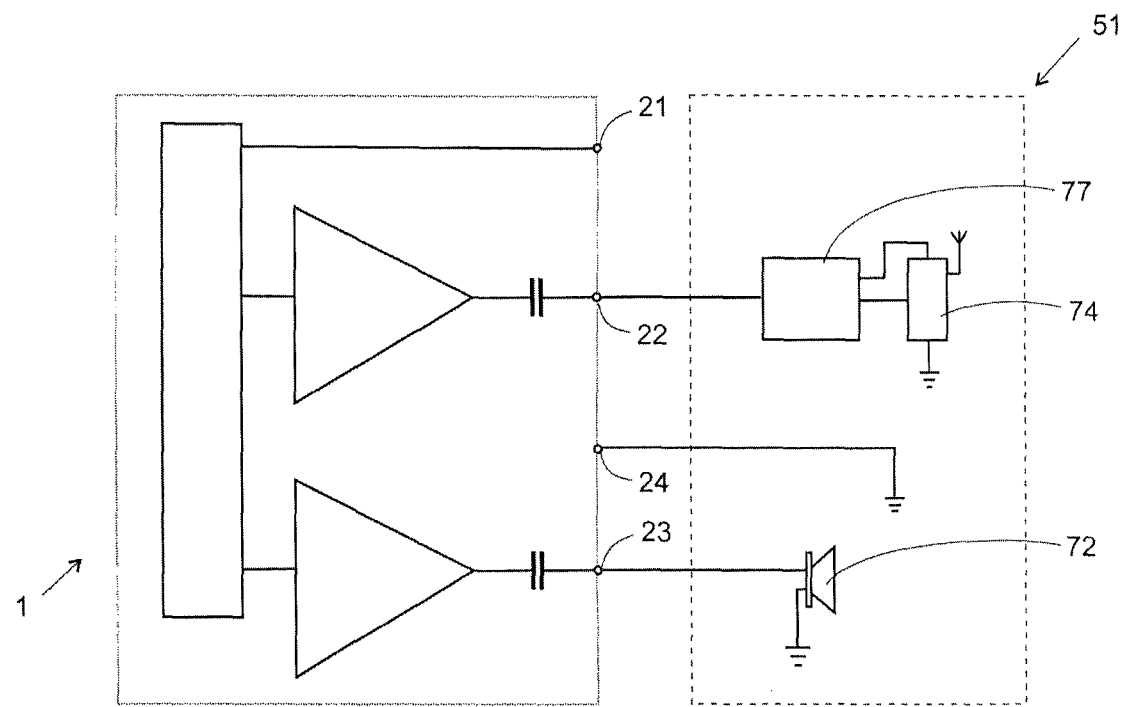
FIG. 4(c) is a diagram of another illustration of the preferred second embodiment where the power to the electronics in the comms apparatus is harvested from an audio output of the first electronic device.

FIG. 4(b) depicts a preferred second embodiment of the present invention, and FIGS. 4(c) and 4(b) depicts two variants thereof. In these embodiments, Electronics 74 in Comms Apparatus 51 embodies a transmitter and/or electronics, and now requires power, hence active; by comparison, Transmitter 71 the second embodiment of the invention in FIG. 4(a) is passive, In FIG. 4(b), the power for Electronics 74 is harvested from Microphone Input 21, via Power Harvester-cum-Management 73.

Figure 4D:
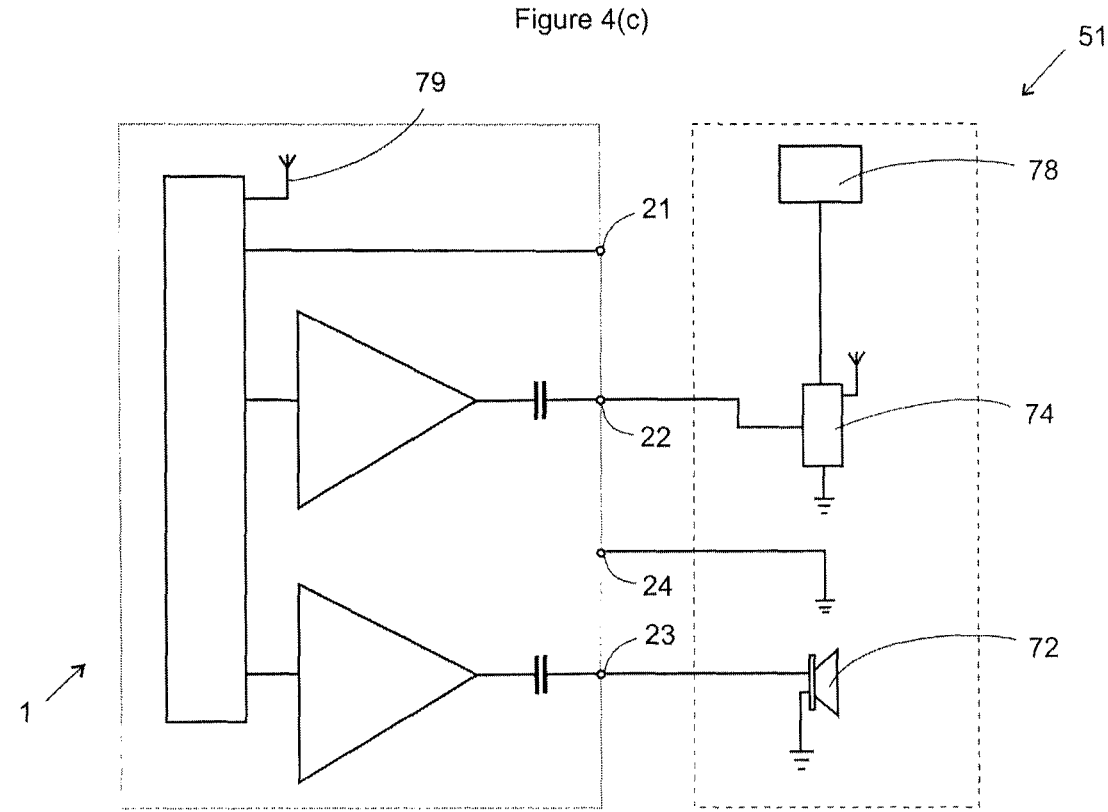
FIG. 4(d) is a diagram of yet another illustration of the preferred second embodiment where the power for the electronics in the comms apparatus harvested from the radio frequency transmission of the first electronic device.

In FIG. 4(c), the power is now harvested from the audio output of Left Output Channel 22 via Harvester-cum-Power Management 77 and this audio output is also input to Electronics 74. Harvesting power from an audio output is a well-established art. In FIG. 4(d), power for Electronics 74 is now harvested from the radio frequency transmission of Mobile Phone 1. Harvesting radio frequency power is also a well-established art. Depending on the specific application, Harvester-cum-Power Management 73, 77 and 78 may comprise the sensor/pick-up, and very simple electronics, for example having no electronics, a capacitor, or having more complex electronics including a DC-DC converter and regulator, battery charger, etc. The design of these Harvester-cum-Power Management is well-established art.

For the same example application of a simplex transmission between Mobile Phone 1 (electronic device) and another electronic device (e.g. Hearing Aid 54), Electronics 74 in FIGS. 4(b)-(d) is now an active transmitter and its input is Left Channel Output 22 of Mobile Phone 1. In this case, the modality of transmission can include radio frequency (RF) and other means that require power, including added gain for passive modalities such as magnetic induction that may involve an amplifier to provide further amplification to the transmitting telecoil. If RF is used, the transmission may be of various protocols, including Bluetooth and its variants, Ultra Wide Band, HIBAN (Hearing Instrument Body Area Network), etc. As before, in other applications, the simplex transmission may be used for wireless control, communications, etc.

Figure 2B:
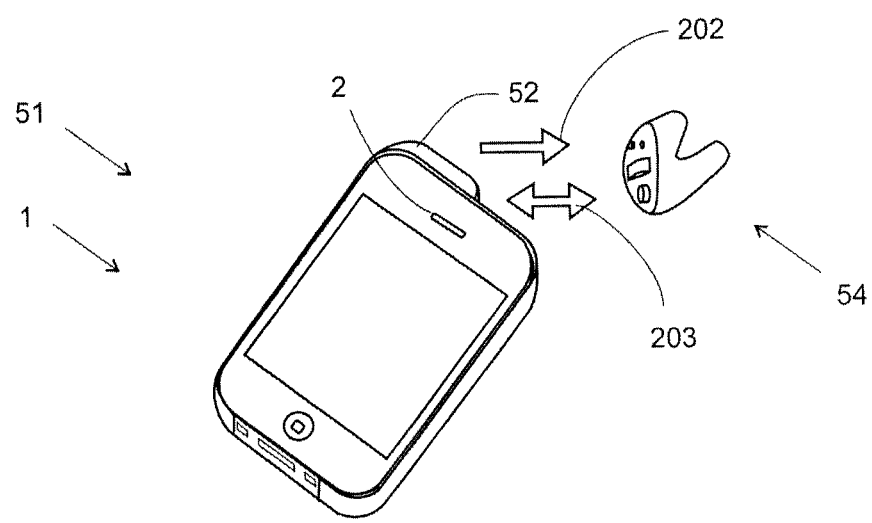
FIG. 2(b) is a diagram following FIG. 2(a) where the first electronic device (smartphone) now slipped into the housing of the Comms Apparatus, with the earphone plug of the Comms Apparatus inserted into the earphone socket of the first electronic device. In some embodiments of the present invention, the first electronic device (smartphone) may communicate with the second electronic device (hearing aid) via the communications apparatus.

As in FIG. 4(a), in the one application where first electronic device Mobile Phone 1 communicates with second electronic device Hearing Aid 54 (FIG. 2(b)), the acoustical output of Loudspeaker 2 of Mobile Phone 1 is restored by connecting Loudspeaker 72 to Right Channel Output 23 of Mobile Phone 3. In this fashion, Mobile Phone 1 has the usual acoustical output—and with wireless transmission to the second electronic device. In another application, Loudspeaker 72 may be replaced by another transmitter, either Transmitter 71 or Electronics 74 (which also embodies a wireless transmitter). The wireless transmission here can be of more than one wireless modality/protocol; if they are of the same protocol, the transmission strength is doubled.

Figure 4E:
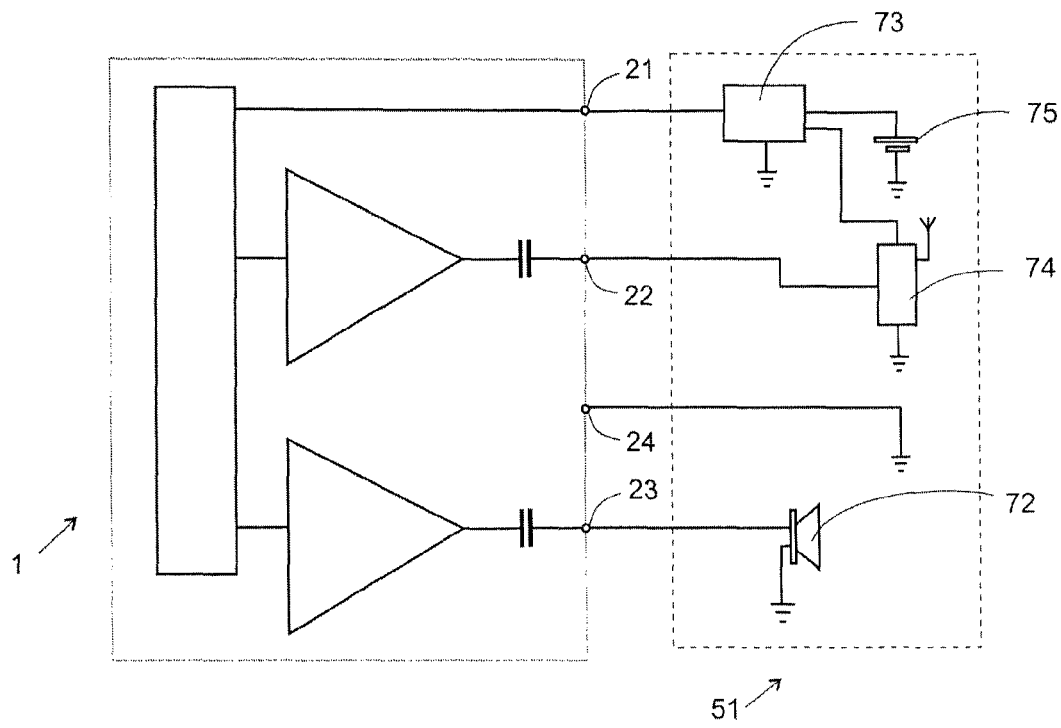
FIG. 4(e) is a diagram of further preferred second embodiment of the present invention where a battery is embodied in the communications device. The battery is recharged by energy harvesting means, in this case via the microphone input. The battery augments the power source to the electronics in the communications apparatus.

FIG. 4(e) depicts a further preferred second embodiment of the invention where Battery 75 is now embedded in Comms Apparatus 51 and the power to recharge Battery 75 is harvested from Microphone Input 21 (or other means as in FIG. 4(b) or 4(c)). As before, Electronics 74 embodies electronics (and a wireless transmitter). Loudspeaker 72 may be connected if it is desired for Comms Apparatus 51 to have an acoustical output from Right Channel Output 23 of Mobile Phone 1.

The modus operandi is as follows. Consider first the scenario where Electronics 74 is idle (inactive). In this case, the power to recharge Battery 75 is harvested from Microphone Input 21 or via Harvester-cum-Power Management 73).

Consider now the second scenario where Electronics 74 is active. If sufficient power can be harvested from Microphone Bias 21, the power to operate Electronics 74 is harvested from Microphone Bias 21 and Battery 75 does not provide any power; sufficiency of power can be ascertained (by Power Management 73) by the level of the bias voltage of Microphone Bias 21 or by other means. If there is further sufficient power from Microphone Input 21, the power to recharge Battery 75 can also be harvested from Microphone Bias 21, and if not, Battery 75 would not be recharged. In the situation where the power harvested from Microphone Bias 21 is insufficient to operate Electronics 74, Battery 75 will be the augmented power source. In the above scenarios, switches in Harvester-cum-Power Management 73 will do the necessary connections to effect the aforesaid connections.

Note that as Battery 75 now augments as a power source, the sophistication of Electronics 74 may be considerably more complex. For example, if Electronics 74 includes a transmitter based on magnetic induction, Electronics 74 could further comprise an amplifier to amplify the signal output of Left Output Channel 22. This amplification would increase the generated magnetic field, thereby further improving the strength/quality of the transmission. The signal from Left Output Channel 22 may also be processed and converted to digital for digital magnetic induction (instead of the usual analog magnetic induction).

Electronics 74 may further comprise other electronics and a wireless receiver that receives signals from the second electronic device (e.g. the transmitter in a Hearing Aid 54 (FIG. 2(b)), pacemaker, etc.). It is a transceiver including both a transmitter and a receiver. In this example, the communications between first electronic device Mobile Phone 1, Comms Apparatus 51 and second electronic device (e.g. Hearing Aid 54) is as follows. The communications between Mobile Phone 1 and Comms Apparatus is simplex (from Left Output Channel 22 of first electronic device Mobile Phone 1 to Electronics 74 of Comms Apparatus 51). As Electronics 74 in Comms Apparatus 51 includes a transceiver, the communications between Comms Apparatus 51 and the second electronic device (comprising a transceiver as well) is duplex.

Figure 4F:
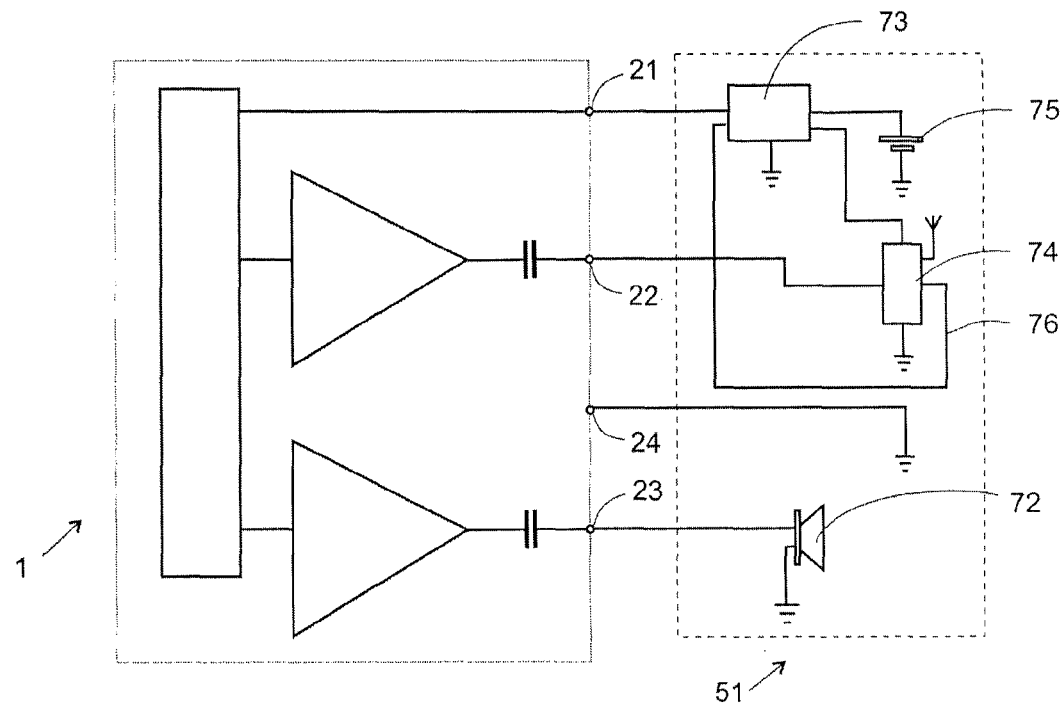
FIG. 4(f) is a diagram illustrating the yet further preferred second embodiment where the electronics in the comms apparatus has a means to input signals to the microphone input of the first electronic device. Switches in the comms apparatus connect the microphone input to the output of the electronics, or connect the microphone input as a power source for the electronics or as the harvesting means to recharge the battery. Although not shown here, said switches may also connect an external microphone to the microphone input.

To further improve the versatility of Comms Apparatus 51 by enabling full duplex communications between first electronic device Mobile Phone 1 and Comms Apparatus 51 (hence full duplex communications between Mobile Phone 1 and second electronic device (e.g. Hearing Aid 54, pacemaker, etc.) with Comms Apparatus 51 as an intermediary communications device), the further preferred second embodiment of the invention shown in FIG. 4(e) is slightly modified to the yet further preferred second embodiment of present invention depicted in FIG. 4(f). In this embodiment, the duplex communications between Mobile Phone 1 and Comms Apparatus 51 is as follows. Left Channel Output 22 of Mobile Phone 1 transmits data to Electronics 74 of Comms Apparatus 51, and Electronics 74 in Comms Apparatus 51 via Connection 76 transmits data to Microphone Input 21 of Mobile Phone 1 (via switches in Power Management 73).

In this further preferred second embodiment of the present invention in FIG. 4(d), the overall communications between first electronic device Mobile Phone 1 (electronic device) and second electronic device (e.g. Hearing Aid 54) is summarized as follows. In the forward path, Left Channel Output 22 of Mobile Phone 1 is output to Electronics 74 of Comms Apparatus 51, and then processed/transmitted wirelessly by the transmitter in Electronics 74 to the receiver in the second electronic device (e.g. Hearing Aid 54). In the reverse path, the transmitter in the second electronic device transmits to the receiver in Electronics 74 of Comms Apparatus 51, and after processing, Electronics 74 outputs to Microphone Input 21 of first electronic device Mobile Phone 1 via Connection 76. The connection between the output of Electronics 74 and Microphone Input 21 of Mobile Phone 1 is obtained by switches in Harvester-cum-Power Management 73. Similarly, if an External Microphone is desired to be connected (as in FIG. 3(d) and not shown in FIG. 4(f)), it may likewise be connected as switched appropriately by switches in Harvester-cum-Power Management 73.

In summary, in this yet further preferred second embodiment in FIG. 4(f), Comms Apparatus 51 is effectively an intermediary full-duplex communications device between first electronic device Mobile Phone 1 and second electronic device (e.g. Hearing Aid 54). If Mobile Phone 1 is internet enabled, Mobile Phone 1 and Comms Apparatus 51 are collectively an intermediary device between the second electronic device (e.g. Hearing Aid 54) and a third electronic device (e.g. hearing aid diagnostic system) connected at the far end the internet link (Mobile Phone 1 being the near end of the internet). For completeness, Loudspeaker 72 may be connected if it is desired for Comms Apparatus 51 to have an acoustical output from Right Channel Output 23 of Mobile Phone 1.

To yet further improve the versatility of the invented Comms Apparatus 51, it is not necessary to use the audio outputs (Left Channel Output 22 and Right Channel Output 23) of Mobile Phone 1 as a communications conduit to Comms Apparatus 51, thereby allowing full use of a earphone headset accessory; this is unlike the second embodiments (and variants thereof) in FIG. 4. This is the third embodiment of the present invention and depicted in FIG. 5 where one application is full wireless duplex communication between first electronic device (e.g. Mobile Phone 1) and second electronic device (e.g. Hearing Aid 54, pacemaker, etc.).

Figure 5:
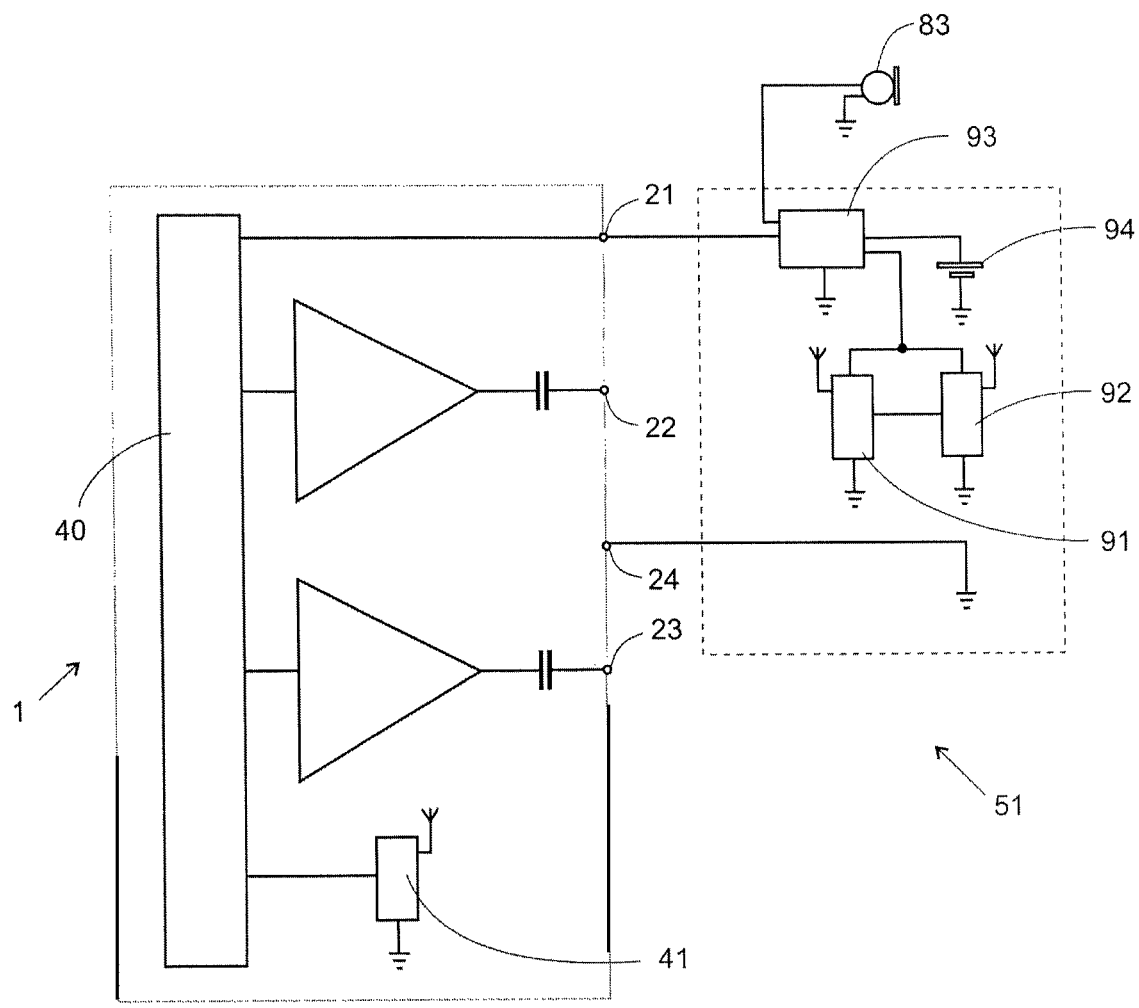
FIG. 5 is a diagram illustrating the third embodiment of the present invention as a comms apparatus where the audio earphone output of the first electronics device (smartphone) is unused (or it may be connected to a earphone (not shown)). The communications between electronics in the comms apparatus and the first electronic device is wireless or the output of the electronics in the comms apparatus is input to the first electronic device via the microphone input. In the former, the electronics in the comms apparatus has two transceivers—one to communicate with the first electronic device and the other to communicate with the second electronic device (e.g. hearing aid in FIG. 2(b)).

In FIG. 5, Mobile Phone 1 comprises Transceiver 41 (for example Bluetooth, UWB, etc), in addition to its usual transceiver for telephony (for example GSM or CDMA, not shown). Comms Apparatus 51 comprises two transceivers: Transceiver 91 (whose communications protocols are compatible to that of Transceiver 41) and Transceiver 92. Second electronic device (e.g. Hearing Aid 54 in FIG. 2(b)) embodies a transceiver, for example that based on the HIBAN (Hearing Instrument Body Area Network) protocol. The transceiver in the second electronic device and Transceiver 92 have the same protocols, for example HIBAN. By means of the two transceivers in Comms Apparatus 51, Comms Apparatus 51 serves as a full-duplex wireless intermediary communications apparatus between first electronic device Mobile Phone 1 and second electronic device; if full-duplex is not desired, one or more of the transmitters or receivers in the associated transceiver(s) may be removed.

The modus operandi for the full-duplex wireless communications is as follows. In the forward path, the transmitter in Transceiver 41 of Mobile Phone 1 transmits to the receiver in Transceiver 91 in Comms Apparatus 51. This received signal is processed and transmitted by the transmitter in Transceiver 92 of Comms Apparatus 51 to the receiver in the transceiver in the second electronic device (e.g. Hearing Aid 54 in FIG. 2(b)). In the return path, the transmitter in the transceiver in second electronic device (e.g. Hearing Aid 54) transmits to the receiver in Transceiver 92 of Comms Apparatus 51. The received signal is processed and transmitted by the transmitter in Transceiver 91 of Comms Apparatus 51 to the receiver in Transceiver 41 of Mobile Phone 1.

Further, if Mobile Phone 1 is internet enabled, a third electronic device at the other end of the internet can now communicate (full-duplex) with the second electronic device. Consider the use of this third embodiment of the invention for a revolutionary hearing aid application (and other like applications) where the third electronic device at the far end of the internet connection is a hearing aid diagnostic system, first electronic Mobile Phone 1 is at the near end of the internet, and Hearing Aid 54 being the second electronic device. Mobile Phone 1 and Comms Apparatus 51 are now collectively the intermediary communications devices between the second electronic device (e.g. Hearing Aid 54) and the third electronic device (hearing aid diagnostic system). The manufacturer of a hearing aid by means of the hearing aid diagnostic system may now remotely diagnose (and/or program, collect data, etc.) the hearing aid.

The overall communications system is as follows. Third electronic device, the hearing aid diagnostic system, at the far end of the internet connection communicates (for example, via GSM, CDMA, etc.) to Mobile Phone 1 at the near end of the internet. Transceiver 41 in Mobile Phone 1 thereafter communicates (e.g. via Bluetooth) with Transceiver 91 in Comms Apparatus 51. Transceiver 92 in Comms Apparatus 51 finally communicates (for example, via HIBAN) with the transceiver in the second electronic device, Hearing Aid 54, In FIG. 5, the power via Power Management 93 for Transceivers 91 and 92 in Comms Apparatus 51 may be harvested from Microphone Input 21 of Mobile Phone 1 (or by other harvested means delineated earlier). As in previous embodiments, Harvester-cum-Power Management 93 may embody a sensor/pick-up and be as simple as not requiring any other electronics, a capacitor or it may embody more complex electronics including a DC-DC converter, a linear regulator, battery charger, etc. The harvester-cum-power management may be similar to previous embodiments of Comms Apparatus 51 with an embedded battery. For the first scenario where Transceivers 91 and 92 (and associated electronics) are idle (inactive), the power to recharge Battery 94 is harvested from Microphone Input 21. In the second scenario where Transceivers 91 and 92 (and associated electronics) are active and if sufficient current/power can be harvested from Microphone Bias 21, the power to operate Transceivers 91 and 92 (and associated electronics) is harvested from Microphone Bias 21 and Battery 94 does not provide any power; sufficiency of power can be ascertained by several methods. If there is sufficient power from Microphone Input 21, the power to recharge Battery 94 can also be harvested from Microphone Bias 21, and if not, Battery 94 would not be recharged. In the situation where the power harvested from Microphone Bias 21 is insufficient to operate Transceivers 91 and 92 (and associated electronics), Battery 94 will be the secondary power source. In the above scenarios, switches in Power Management 93 will do the necessary connections to effect the aforesaid connections, and methods to enable this is well-established.

Also as in previous embodiments involving the possible connection of External Microphone 83, switches in Harvester-cum-Power Management 93 will switch the appropriate connections.

The first, second, third embodiments and their variants (preferred, further preferred and yet further preferred embodiments) of the present invention (Comms Apparatus 51) described herein may be physically embodied within a small casing (Casing 52) depicted in FIG. 2(a). Casing 52 here is part of a bumper housing that encloses the sides of the enclosure of Mobile Phone 1.

There are a number of ways to design the housing of Comms Apparatus 51. For example, the bumper may have a backing such that the housing of Comms Apparatus 51 is now a casing which protects both the back and the sides of Mobile Phone 1. It is also possible to design the housing of Comms Apparatus 51 such that it much smaller and only largely comprises Casing 52 and Plug 53. For example, this smaller housing may be adapted to be attached only to the top of Mobile Phone 1, or near the earphone socket of other electronic devices. In this fashion, the mechanical integrity of Comms Apparatus 51 is not only the TRS/TRRS Plug 53 (FIG. 2(a) of Comms Apparatus 51 inserted into Socket 3 (FIG. 1(a)) of Mobile Phone 1 but also the mechanical attachment of the housing of Comms Apparatus 51 to the enclosure of Mobile Phone 1. Mechanically, it would advantageous to keep the height profile of casing 52 low so that the protrusion is low, hence enhanced mechanical integrity.

A possible alternative design of the housing of Comms Apparatus 51 is to embody the electronics therein within the backing of the housing/casing. In this case, the height of the housing is the same as that of a regular casing. This design may be more cosmetically pleasing to some users.

Some casings for Mobile Phone 1 have an internal battery that serve as an auxiliary power source (to Mobile Phone 1) and where it is charged externally. Comms Apparatus 51 may likewise be realized as a casing with an external battery where power for the electronics in Comms Apparatus 51 may be derived from the external battery. A person skilled in the art in bumper/housing design for Mobile Phone 1 would be able to design many variations.

For completeness, note that there are several significant advantages of the embodiments of the invention when it is embodied in a housing that is adapted to be at least in part attached to the enclosure of Mobile Phone 1. The first significant advantage is the close proximity of the electronics (including transmitters and receivers) in Comms Apparatus 1 to first electronic device Mobile Phone 1 and to a second electronic device (e.g. hearing aid). Because of this close proximity, the power for transmission for Mobile Phone 1, for Comms Apparatus 51 and for the second electronic device is very low. This translates to very low power requirements that allow the use passive transmitters, active transceivers whose power is harvested and where pertinent, the use of a subminiature rechargeable battery in Comms Apparatus 51 or elsewhere.

The second significant advantage is the sheer convenience of having Comms Apparatus 51 being a part of Mobile Phone 1, particularly due to its small form factor, instead of having a separate device entity. In most prior-art devices, they are separate device entities, external to Mobile Phone 1.

The third significant advantage of the embodiments of the invention is that Mobile Phone 1 largely retains full functionality. For example, in FIGS. 4(a)-(f), the audio output from Loudspeaker 2 (FIGS. 1(a) and 1(b), the loudspeaker of Mobile Phone 1) can be restored/obtained by the loudspeaker in Comms Apparatus 51. The need to have an acoustical output (from a loudspeaker) in a hearing aid application is important for users who have open-fit hearing aids or with ear moulds with large vents. These users would further benefit from the added communication provided for by the wireless transmission from Comms Apparatus 51 to their hearing aid, e.g. magnetic induction, etc.

It should be understood to those skilled in the art that although the preferred embodiments have been shown here as a way of teaching the best way to make and use the invention, various modifications can be made to fit the needs or preferences of the user or the manufacturer, and such modifications may be viewed in the perspectives of the advantages of the present invention.

Figure 3A:
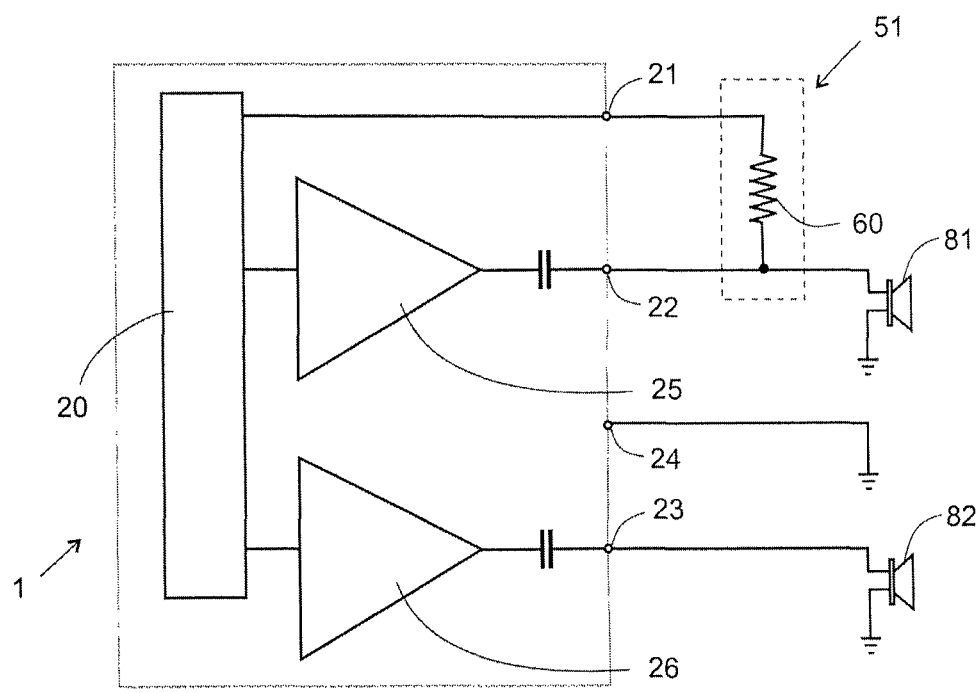
FIG. 3(a) is a diagram illustrating the first embodiment of the invention as a comms apparatus where the resistor therein provides a means for the microphone input to sample one audio channel output of the earphone output.
Figure 3B:
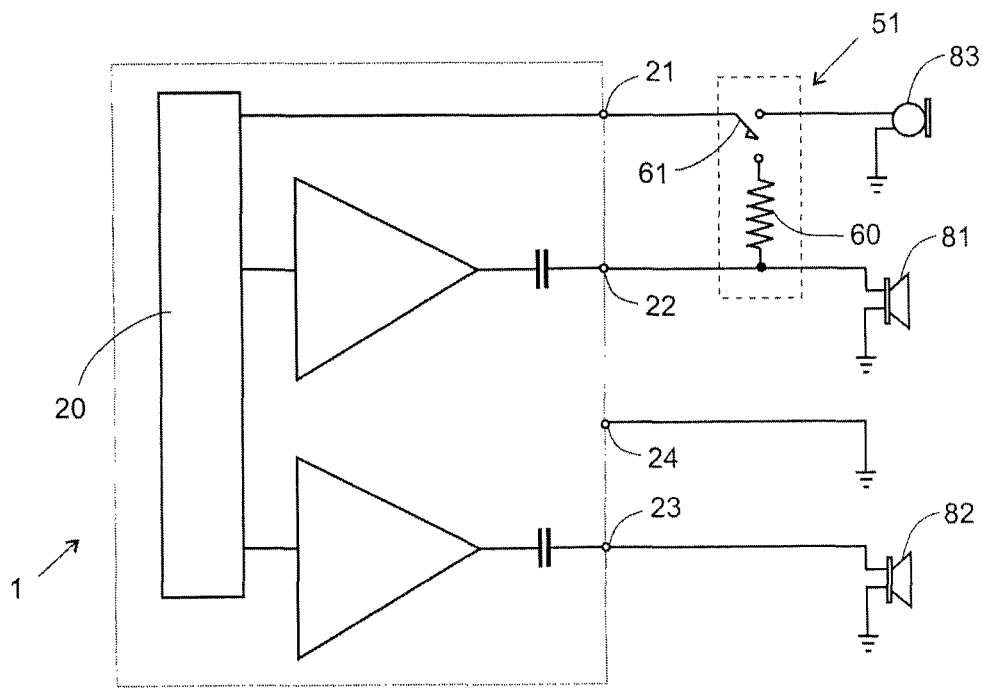
FIG. 3(b) is a diagram illustrating the preferred first embodiment of the invention where there is a means for the resistor to be connected/disconnected when desired, thereby enabling the external microphone to be connected to the microphone input of the electronic device.
Figure 3C:
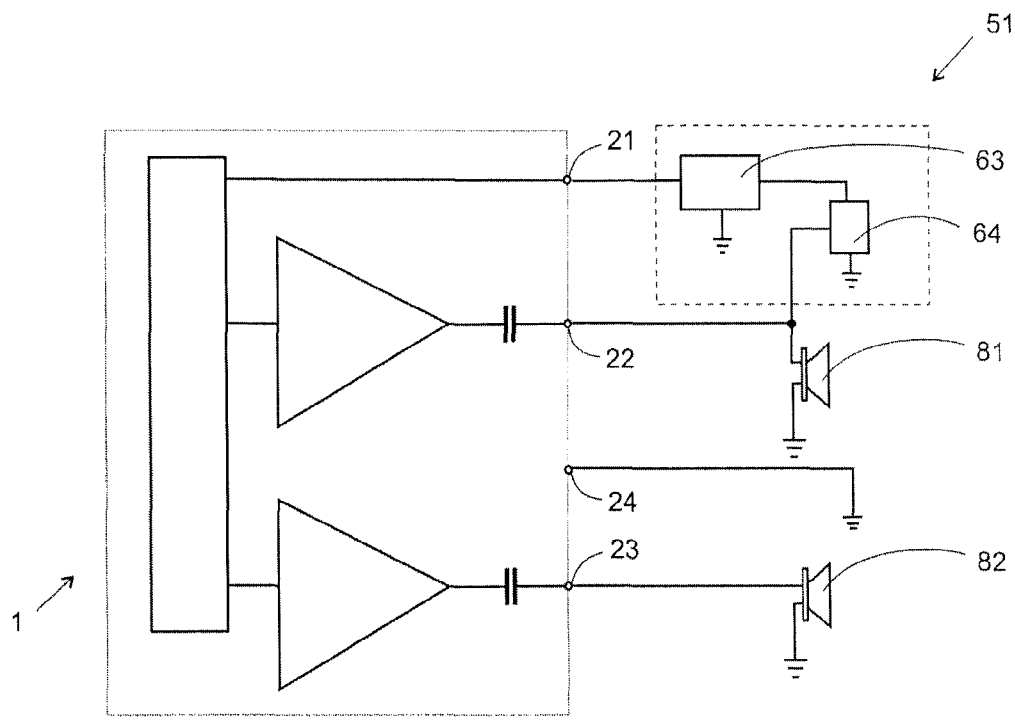
FIG. 3(c) is a diagram illustrating the further preferred first embodiment of the invention where the electronics in the comms apparatus samples an audio output of the earphone, and the power to said electronics is derived from the microphone input of the electronic device.
Figure 3D:
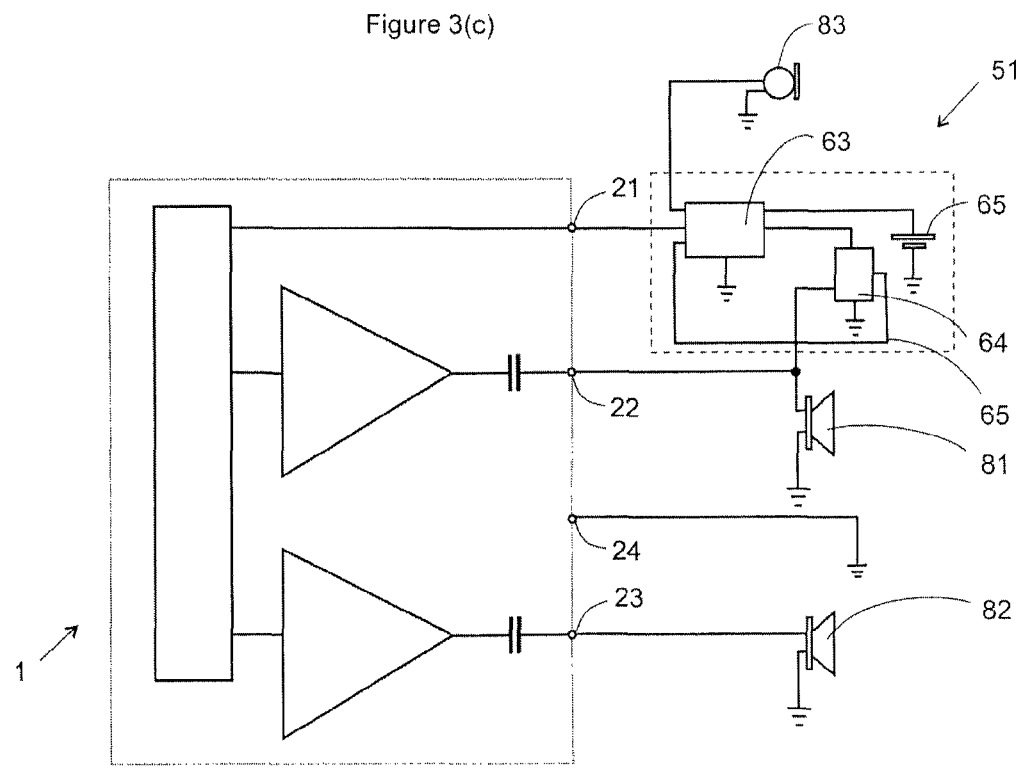

For example, in FIGS. 3(b), 3(d), and 5, External Microphone 83 may be connected to Microphone Input 21 of Mobile Phone 1. Typically, External Microphone 83 (as an audio accessory) is used when Mobile Phone 1 is used for telephony and the like where the primary transceiver (typically GSM or CDMA) is active. During telephony and the like, there is substantial RF transmission and this is easily detected. The electronics in Comms Apparatus 51 can easily take advantage of the detection of strong RF transmission to disconnect all other connections and connect Microphone 83 to Microphone Input 21. In this fashion, the full functionality of a earphone/microphone audio accessory would be available.

It should be appreciated that the applications of the embodiments of the invention is general and not limited only to audio signals. The invented Comms Apparatus 51 herein may be viewed as general purpose intermediary communications device between a first electronic device (for example Mobile Phone 1) and a second electronic device (e.g. hearing aid, speech processors for medical devices and the like, etc). For example, an application of the present invention that does not involve audio signal transmission is the use of Mobile Phone 1 (via Comms Apparatus 51) as a remote controller to control the functions of a hearing aid, pacemaker and the like. Such functions may include adjusting the volume, changing the program, etc. There are several ways of doing this and one simple means is for Mobile Phone 1 to output different specific sequence of tones via Left Channel Output 22 for different control commands. The electronics in Casing 52 will interpret these specific tones and transmit the corresponding signals wirelessly to the hearing aid. In this fashion, the combined Mobile Phone 1-cum-Comms Apparatus 51 replaces the dedicated remote control of the hearing aid.

Other applications become possible if different transducers are incorporated in Comms Apparatus 51. For example the Mobile Phone 1-cum-Comms Apparatus 51 can also become a TV remote controller as an infrared transmitter.

Although the embodiments of the invention herein have been shown using Mobile Phone 1, other electronic devices may be used. For example, a cordless (DECT) phone or two-way radios (walkie-talkies) may be used. Further, to improve the universality of the invented Comms Apparatus 51, it may be further comprise a general-purpose socket such as USB (other than and/or including the TRS or TRRS socket).

Having described the above embodiments with reference to the accompanying drawings, it is to be understood that the invention is not limited to these embodiments and that various changes and modifications can be made by one skilled in the art without departing from the spirit and scope of the novel concepts of the invention as defined in the appended claims.

We claim:

1. A communications apparatus comprising:
    at least one transmission telecoil for transmitting wireless magnetic induction signals to a hearing aid, which is embodied in a housing,
    said at least one transmission telecoil being connected to an electronic audio output and ground of an electronic device,
    said hearing aid having a receiving telecoil for receiving wireless magnetic induction signals from said transmission telecoil,
    said electronic device is embodied in an enclosure,
    said housing is adapted to be physically attached to at least part of said enclosure, and
    said communication apparatus can transmit said wireless magnetic induction signals via said transmission telecoil using power received from the electronic device without requiring a battery or external power source.

2. A communications apparatus as cited in claim 1, wherein said electronic device embodies at least one wireless transceiver.

3. A communications apparatus as cited in claim 1, wherein
    said electronic device having a microphone input,
    said communications apparatus having a means to input signals to said microphone input, and
    said input signals are indication of functionality or diagnosis of said hearing aid.

4. A communications apparatus as cited in claim 1, wherein
    said electronic device having an audio output, and
    said communications apparatus having an input connected to said audio output.

5. A communications apparatus as cited in claim 1, wherein the communications apparatus is configured to transmit a first magnetic induction signal, and wherein said first magnetic induction signal includes a signal indicative of control of said hearing aid.

6. A communications apparatus as cited in claim 1, wherein
    said electronic device embodies a wireless transceiver receiving signal indicative of an audio frequency signal, said communications apparatus transmits a first magnetic induction signal, and
    said first magnetic induction signal includes an indicative of said audio frequency signal.

7. A communications apparatus as cited in claim 1, wherein
    said hearing aid having a transmitter transmitting a first wireless signal, and
    said communications apparatus having a wireless receiver receiving said first wireless signal.

8. A communications apparatus as cited in claim 7, wherein an indicative of said first received wireless signal is input to said electronic device.

9. A communications apparatus as cited in claim 1 having a loudspeaker, wherein said electronic device having an audio output connected to said loudspeaker.

10. A communications apparatus as cited in claim 1, wherein the communications apparatus communicates with the electronic device wirelessly.

* * * * *